(12) United States Patent
Dybalski

(10) Patent No.: US 6,715,726 B1
(45) Date of Patent: Apr. 6, 2004

(54) SURFACE MOUNTED EXPANDABLE CUPHOLDER

(75) Inventor: Ronald Henry Dybalski, Oxford, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/713,682

(22) Filed: Nov. 15, 2000

Related U.S. Application Data

(60) Provisional application No. 60/201,574, filed on May 1, 2000.

(51) Int. Cl.⁷ ................................................ A47K 1/08
(52) U.S. Cl. ..................... 248/311.2; 224/926
(58) Field of Search ................ 248/311.2; 224/281, 224/282, 926; 297/188.17, 188.16, 188.15

(56) References Cited

U.S. PATENT DOCUMENTS

| | | | |
|---|---|---|---|
| 1,483,592 A | * | 2/1924 | Pelstring |
| 2,107,845 A | * | 2/1938 | Albert |
| 3,814,359 A | * | 6/1974 | Powell |
| 4,583,707 A | | 4/1986 | Anderson .................... 248/293 |
| 5,141,194 A | | 8/1992 | Burgess et al. .......... 248/311.2 |
| 5,603,477 A | * | 2/1997 | Deutsch |
| 5,618,018 A | * | 4/1997 | Baniak |
| 5,634,621 A | | 6/1997 | Jankovic .................. 248/311.2 |
| 5,823,410 A | * | 10/1998 | Ackeret |
| 5,845,888 A | * | 12/1998 | Anderson |
| 5,865,411 A | | 2/1999 | Droste et al. ............ 248/311.2 |
| 5,899,426 A | | 5/1999 | Gross et al. ............. 248/311.2 |
| 5,997,082 A | | 12/1999 | Vincent et al. ......... 297/188.19 |
| 6,047,937 A | | 4/2000 | Huang ...................... 248/311.2 |
| 6,217,483 B1 | * | 4/2001 | Kallassy |

* cited by examiner

Primary Examiner—Korie Chan
(74) Attorney, Agent, or Firm—Scott A. McBain

(57) ABSTRACT

A deployable cup holder for use inside a vehicle having a retaining member depending outwardly frown a support member. The support member is adapted to be received within a receiving receptacle and the retaining member is stowed in a receiving area when the cup holder is in a stowed position. The support member travels out of the receptacle and locks into a deployed position. Once in this deployed position the retaining member provides a receiving area for receiving and supporting a beverage container.

19 Claims, 5 Drawing Sheets

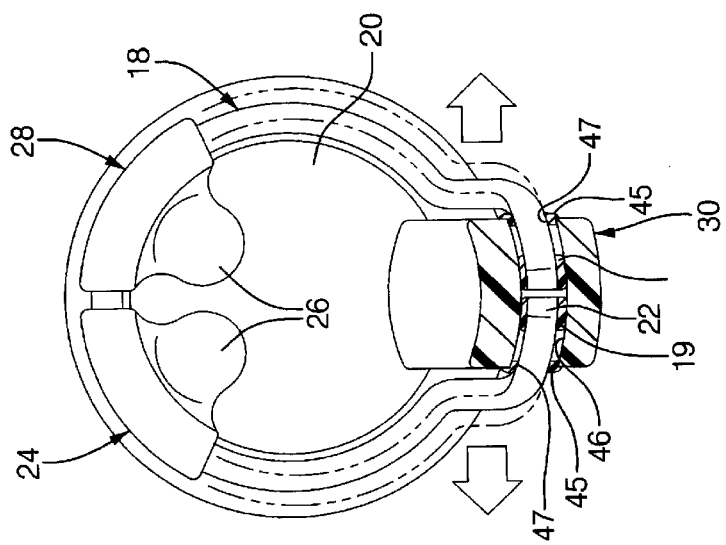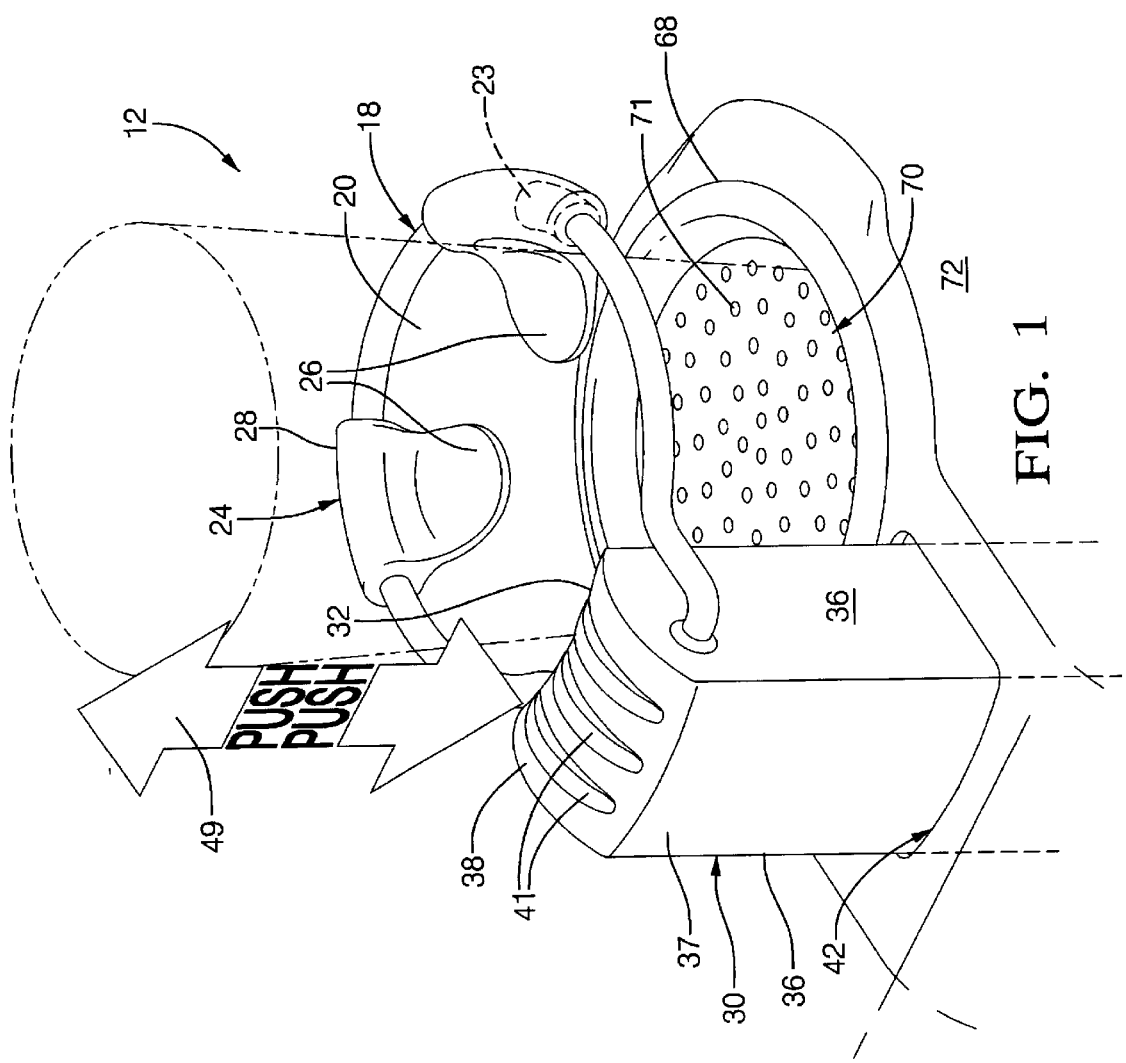

SURFACE MOUNTED EXPANDABLE CUPHOLDER

CROSS REFERENCE TO RELATED APPLICATIONS

This application claims the benefit of U.S. Provisional Patent Application No. 60/201,574, filed on May 1, 2000, the contents of which are incorporated herein by reference.

TECHNICAL FIELD

The present invention relates to cup holders, and more particularly to a deployable cup holder.

BACKGROUND OF THE INVENTION

Cup holders or container holders for receiving and supporting cups, cans, or other beverage containers in a vehicle are limited in their ability to receive and support containers of various sizes and configurations. In addition, the receiving area and surrounding locations become filthy as a variety of beverages are spilled in them.

Container holders allow the convenience of a driver or passenger to drink coffee or a soft drink while enduring monotonous commutes to and from work or otherwise in transit. Such container holders hold hot coffee and other beverages, preferably at a location in the vehicle which is easily used by the vehicle operator or passenger. Container holders frequently are located in an armrest or center console to position a beverage container in an area which can be easily used by the operator without distracting the operator from the attention needed for operating the vehicle.

However, these container holders are not stowable and do not allow for containers of various sizes to be inserted therein.

SUMMARY OF THE INVENTION

A deployable mechanism for retaining a beverage includes a retaining member defining an expandable receiving area, a support member receives and supports the retaining member, and the support member is deployed into and out of a receptacle having a receiving area configured to slidably receive the support member.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with reference to the accompanying drawings, in which:

FIG. 1 is a perspective view of an expandable cup holder constructed in accordance with the present invention;

FIG. 2 is a top plan view of the cup holder illustrated in FIG. 1;

DETAILED DESCRIPTION OF THE INVENTION

Referring now to FIG. 1, a cup holder 12 is illustrated. In an exemplary embodiment, cup holder 12 is positioned within comfortable reach of the driver or front passenger. It should be appreciated that cup holder 12 may be disposed in other vehicle interior locations such as the door panels, a slidable tray, or the dashboard which are within comfortable reach of other occupants.

Figure 3:
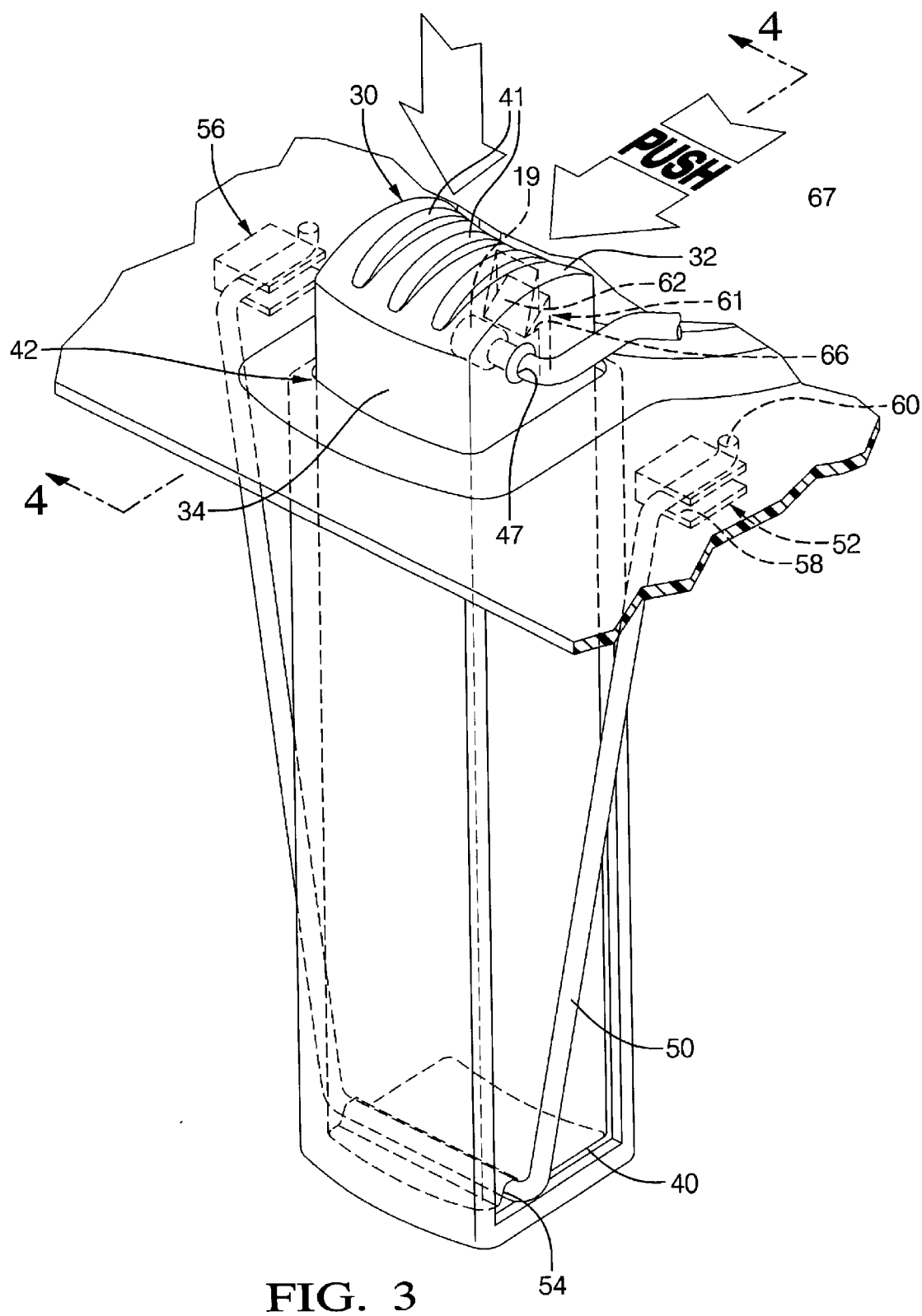
FIG. 3 is a partial perspective view of the cup holder in a stowed position.

Referring now to FIGS. 2–3, cup holder 12 includes a retaining member 18 for receiving and supporting a portion of a cup. Retaining member 18 defines a receiving opening 20 which will receive and engage a portion of a beverage container 21 such as a coffee cup or a soda can.

Retaining member 18 is preferably made of an anodized aluminum wire, which is used to manufacture bicycle bottle holders. The aluminum wire provides strength and is bendable. Retaining member 18 has a resilient characteristic which allows retaining member 18, and accordingly receiving opening 20 to expand from and contract to the original unexpanded configuration. This allows different-sized beverage containers to have a portion of their exterior surface pass through receiving opening 20 and be frictionally engaged by retaining member 18 after the beverage container is inserted into opening 20.

Retaining member 18 preferably has a circular cross section, although other shapes such as rectangle, or hexagon, etc., are contemplated to be within the scope of the present invention.

Retaining member 18 is preferably manufactured of a one piece aluminum wire bent and configured at various locations defining the majority of the circular shaped receiving opening 20, and is configured to have a pair of end pieces 22. Of course, retaining member 18 may be manufactured out of other materials including but not limited to plastic and/or metal having resilient qualities.

End pieces 22 allow for the installation of retaining member 18 onto a deployable support member 30. In addition, the positioning and configuration of end pieces 22, as well as retaining member 18, allow retaining member 18 to expand to a receiving configuration (illustrated by the dashed lines 48 in FIG. 2) and return to a beverage container engaging position. A portion of end portion 22 will make contact with a portion of support member 30 as it expands, and this will prevent retaining member 18 from being completely detached from support member 30.

As an alternative, each end piece 22 also includes a stopper portion 19 for preventing retaining member 18 from being detached from the support member. Stopper portion 19 is configured to have a larger diameter or dimension than a pair end portions 45 attached to the end openings of aperture 46, thus allowing expansion and contraction without retaining member 18 becoming dislodged from support member 30. End portions 45 are secured to aperture 46 after each end piece 22 is inserted therein.

As an alternative, and when stopper portion 19 is attached to end pieces 22, a pair of openings 47 of end portions 45 at either end of receiving aperture 46 are configured to have a smaller opening than that of receiving aperture 46 and stopper portion 19. Since stopper portion 19 has a slightly larger dimension than that of the end openings 47 of end portions 45, end pieces 22 are prevented from coming out of the aperture once the retaining member has been expanded to a larger dimension, shown by the dashed lines 48.

Cup holder 12 further includes a pair of stabilizing tabs 24. Stabilizing tabs 24 are slidably secured to retaining member 18. Stabilizing tabs 24 provide a surface area for engaging, stabilizing and securing a portion of beverage container 21 as it is being inserted into receiving opening 20. The movable nature of stabilizing tabs 24 allows cup holder 12 to receive and engage beverage containers having a diameter smaller than the unbiased diameter of receiving opening 20.

Each stabilizing tab 24 is preferably made out of a resilient material such as rubber, and includes a finger portion 26 extending inwardly from a tubular portion 28. Each stabilizing tab 24 is installed on the retaining member by having retaining member 18 inserted through tubular portion 28. Tubular portion 28 has an inner diameter that is slightly larger than the outside diameter of the cross section of retaining member 18. However, the inner diameter of the tubular portion is configured to provide resistance and friction as installed on the retaining member. This allows the stabilizing tabs to move with respect to retaining member 18 as an item is inserted into the receiving opening defined by the retaining member. In addition, the mobility of stabilizing tabs 24 assists in the stowage of retaining member 18. Accordingly, stabilizing tabs 24 are capable of sliding on retaining member 18. In the case of the alternative embodiment wherein stopper portions 19 are disposed on end portions 22 tabs 24 are secured to retaining member 18 prior to the securement of stopper portions 19 thereon.

Alternatively, stabilizing tabs 24 may be made out of other resilient material such as plastic.

Alternatively, each stabilizing tab 24 may include a spring 23 or other biasing member, which provides a biasing force when the stabilizing tabs are pushed down by the insertion of the beverage container. This biasing force will provide a constant contact between the finger portion and the beverage container, thereby creating a secure grip on the beverage container.

As another alternative, the finger portions themselves may provide for securement through their resilient movement while the tubular portion is secured to the retaining member. The insertion of the beverage container pushes the finger portion down, and the resiliency of the finger portion provides a secure grip on the beverage container while it is placed in receiving opening 20. The finger portion urges back to the initial configuration once the container is removed. Alternatively, the tabs are rubber fingers molded in place.

It should also be noted that the stabilizing tabs provide a means for securing items having a diameter smaller than the diameter of the receiving opening, when the retaining member is in its unexpanded configuration. For example, an item such as a thin water bottle with an outside diameter (illustrated by the dashed lines in FIG. 2) smaller than the inner diameter of receiving opening 20, will be securely engaged in the opening of the cup holder 12.

Of course, as an alternative, it is contemplated that the size, configuration, and number of stabilizing tabs 24 may vary, including but not limited to the incorporation of a stabilizing tab, which depends outwardly from support member 30 into receiving area 20.

Referring now to FIGS. 1–4, cup holder 12 further includes a deployable support member 30. Support member 30 provides a means for securing retaining member 18, as well as the deploying and stowing of cup holder 12.

In an exemplary embodiment, support member 30 has a rectangular shape and comprises a front wall 32, a rear wall 34, and a first and second sidewalls 36, and 37 bounding an upper surface 38 and a lower surface 40. Of course, and as applications may require, the configuration of support member 30 may have shapes other than the rectangular configuration illustrated in FIG. 3. For example, support member 30 may have a circular, orthogonal, triangular, hexagonal, or any other shape which will be received in a corresponding receiving receptacle.

Support member 30 also has a plurality of ribs 41 located on upper surface 38 to assist the driver or the occupant, of the vehicle in locating the cup holder mechanism without taking their eyes off the road. In addition, ribs 41 provide an engaging surface for the fingers of a vehicle occupant.

Support member 30 is received within a receiving receptacle 42 having an opening 44. Opening 44 is slightly larger than the exterior dimensions of support member 30, thereby allowing support member 30 to easily slide between a pair of positions defining a deployed and a stowed position of cup holder 12.

Support member 30 further includes a retaining member receiving aperture 46 located proximate to upper surface 38. Receiving aperture 46 extends from first sidewall 36 at one end to second sidewall 37 at the other end. Aperture 46 is configured to have an inner diameter slightly larger than the outside diameter of retaining member 18. Accordingly, aperture 46 receives a portion of end pieces 22 of retaining member 18.

Retaining member 18 is installed by applying a force which causes the retaining member to open up into an insertion configuration, which causes the end portions to move apart from each other at a distance sufficiently large enough to allow each end 22 to be inserted into aperture 46.

The resiliency of the retaining member allows the retaining member to be configured back into an unbiased position where each end 22 is inserted through aperture 46, and where ends 22 come in close proximity one another.

It should be noted that dashed lines 48 also represent the expansion of retaining member 18 for accommodating beverage containers having an outside diameter larger than the inside diameter of receiving opening 20, and which cause a portion of retaining member 18 to expand outwardly.

It should also be noted that in order to prevent retaining member 18 from pivoting up and down with respect to support member 30, end pieces 22 and aperture 46 are configured to have a rectangular configuration, or a square-like configuration, wherein the cross sectional configuration of end pieces 22 prevents retaining member 18 from rotating once end pieces 22 have been inserted into aperture 46. Accordingly, this configuration allows retaining member 18 to have a perpendicular or substantially perpendicular configuration with respect to support structure 30. The retaining member will also remain substantially perpendicular to the support structure by the frictional forces between the beverage container and the retaining member while the beverage container is inside the receiving area.

In order to assist in raising and deploying cup holder 12 into a deployed position, a biasing force in the direction of arrow 49 is provided to urge member 30 upwardly. In an exemplary embodiment, the biasing force is provided by an elastic cord 50. As an alternative, the biasing force can be provided by a spring 51 or other means to produce a biasing force in the direction of arrow 49.

Elastic cord 50 is secured at both ends to a portion of the vehicle console. Elastic cord 50 is secured to a first retainer member 52 at one end, and then run through a groove 54 disposed on the lower surface 40 of support member 30, and ultimately secured at a second retainer member 56 at the other end.

First and second retainer members 52 and 56 are preferably identical to one another, and their structural features are illustrated with reference to first retainer member 52 only. Retainer member 52 has a slot 58 for receiving a portion of the elastic cord therethrough and securing the cord end against retainer member 52 with an end portion 60 which prevents elastic cord 50 from sliding through slot 58. The configuration and placement of the retaining members and the elastic cord allows for ease of replacement of the same in the event the elastic cord becomes worn or broken.

As stated earlier, in order to prevent elastic cord 50 from slipping out from beneath the support structure, a portion of elastic cord 50 passes through groove 54.

Figure 4:
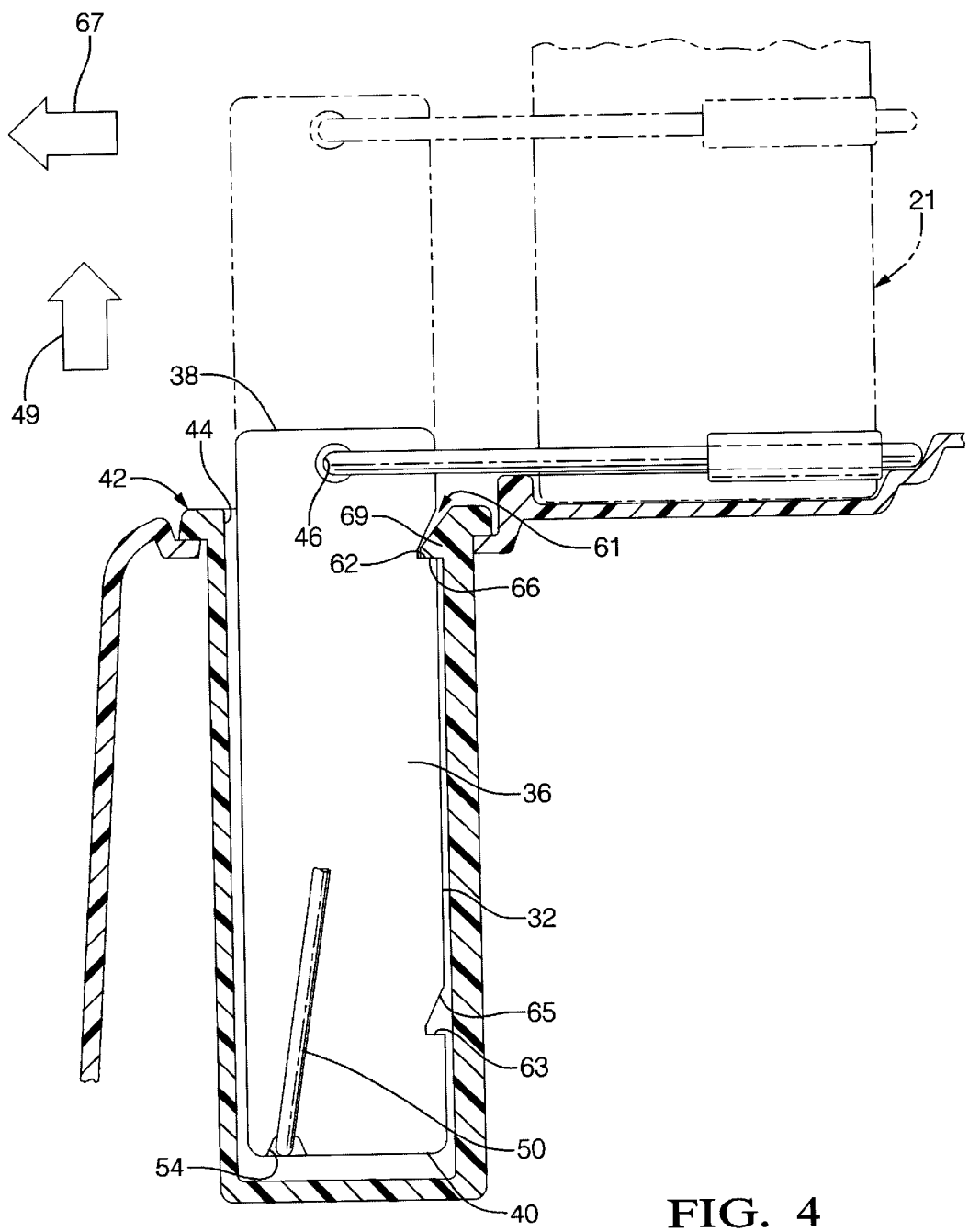
FIG. 4 is a cross sectional view along lines 4—4 of FIG. 3.

Referring now to FIGS. 3 and 4, the elastic cord is in an elongated configuration when the post structure is in a stowed position, and will assist in deploying the cup holder into a deployed configuration by providing an urging force in the direction of arrow 49.

A release and secure mechanism 61 locks cup holder 12 in a deployed and a stowed position.

Release and secure mechanism 61 consists of a pair of notches 62 positioned on front surface 32 of support member 30. Notches 62 are positioned and configured to engage a tab 64 which projects outwardly from the wall of receptacle 42.

Tab 64 is preferably integral to receiving receptacle 42 and has a tongue portion 66 for engaging notches 62. Tongue portion 66 has an angular configuration with respect to the wall of receptacle 42. In addition, notches 62 each have a shoulder portion 63 and an angular or chamfered surface 65. Shoulder portion 63 helps to engage notch 62 with tongue portion 66. Chamfered surface 65 helps to disengage tongue portion 66 from notch 62.

Notches 62 are also preferably integral to support member 30 and are configured to receive tongue 66 of the tab while support member 30 is in a secured, stowed, or deployed position.

Referring now to FIGS. 1–5, and in order to deploy the cup holder into a use configuration from a stowed configuration, support member 30 is pushed downwardly in a direction substantially opposite to arrow 49. This causes tongue portion 66 of tab 64 to slide out of notch 62 by sliding along chamfered surface 65. Once tongue portion 66 is completely removed from notch 62, the user can apply a force in the direction of arrow 67. This allows the biasing forces of elastic cord 50 to push support member 30 upwardly so that tongue portion 66 of tab 64 engage the notch positioned closer to the lower surface of support member 30. Once this notch is engaged by tab 62 and corresponding tongue portion 66, support member 30 is now secured in a deployed configuration. The second notch also prevents support member 30 from being completely removed from receptacle 46.

It is noted that the dimensions of receiving receptacle 42 and support structure 30 are such that support structure 30 may be manipulated in the directions indicated in order to secure and release support structure 30 from release and secure mechanism 61.

In order to stow cup holder 12 into a stowed configuration, a user simply applies a downward force to the top surface of support structure 30, so that tab 64 will disengage from notch 62 until it is reengaged in the upper notch positioned closer to the upper surface of support member.

Of course, it is contemplated that release and secure mechanism 61 may include other means for securing support structure 30 in a stowed and deployed position. For example, a depressible switch on the surface of support structure 30 will manipulate a spring biased engagement portion or portions that will engage a receiving aperture located in receiving receptacle 42 which corresponds to a stowed and deployed position of support structure 30.

Cup holder 12 further includes a recessed area 68 disposed on a surface area proximate to receiving receptacle 42 and directly below retaining member 18. A rubber mat 70, also having a matching recessed area 72, is configured and dimensioned to be received within the recessed area 68 to allow the bottom of a beverage container 21 to rest on the rubber mat within recessed area 72. Rubber mat 70 also includes a plurality of dimples 71 around the perimeter and within the inner circumference of the mat, providing a more secured grip of the beverage container. Rubber mat 70 is used to catch a spilled beverage from the beverage container and is removable for easy cleaning purposes.

It should be noted that cup holder 12 in a stowed position allows for retaining member 18 to directly rest onto recessed area 72 of rubber mat 70. The retaining member in this configuration can also be utilized as a cup holder, preferably while the vehicle is stationary, by simply placing the beverage container on the rubber mat.

Figure 5:
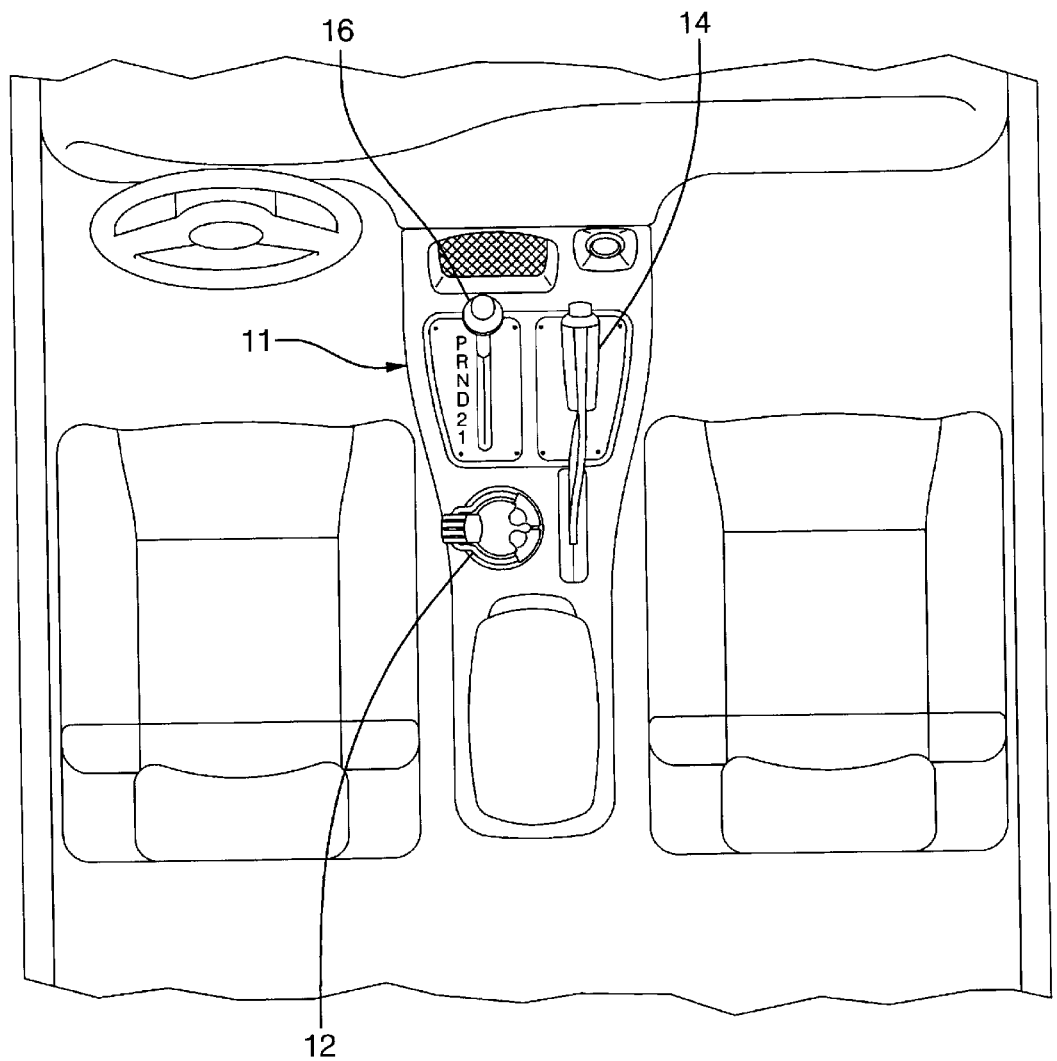
FIG. 5 is a partial view of a vehicle interior illustrating a location of the cup holder.

Referring to FIG. 5, a location of cup holder 12 is illustrated on a center console 11 within an interior of a vehicle. Cup holder 12 is preferably disposed proximate to parking brake 14 and a shifter 16, therefore making the cup holder within comfortable reach of the driver or front passenger.

Figure 6:
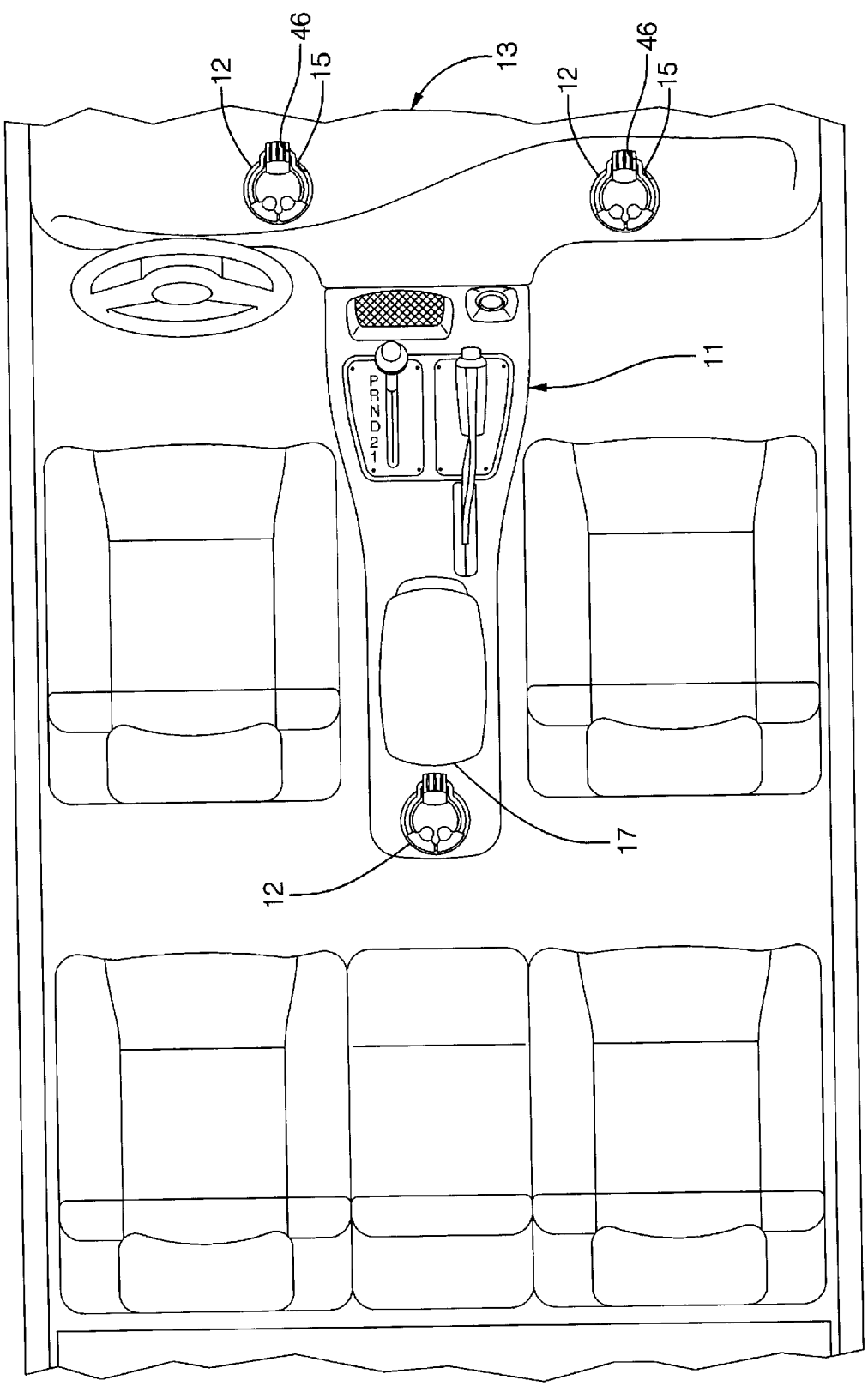
FIG. 6 is a partial view of a vehicle interior illustrating alternative locations for the cup holder.

Referring to FIG. 6, an alternative location of cup holder 12 is illustrated on dashboard 13 within the vehicle interior. Receiving receptacle 42 is placed inside a cut out opening 15 on the dashboard, providing a comfortable reach for the passenger and driver. It should be appreciated that a plurality of cup holders may alternatively be placed in any of the contemplated locations. Yet another alternative location for the cup holder is on a rear passenger console 17, where the cup holder is within comfortable reach of rear passengers.

Advantageously, cup holder 12 improves package space beneath console packages that are restricted due to other components such as the shifter, the parking brake, etc., by occupying a nominal space and yet allowing for a beverage container to be placed on the cup holder mechanism in the stowed position. Moreover, cup holder 12 only requires a single linear push to deploy it or stow it, making the task easy for the vehicle occupant.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A deployable mechanism for retaining a beverage container in a vehicle, comprising:
    a) a metal wire having resilient characteristics and being configured and dimensioned to define an expandable receiving area;
    b) a support member being configured to receive and support said metal wire; and
    c) a receptacle, said receptacle having a receiving area configured and dimensioned to slidably receive said support member, a portion of said support member traveling into and out of said receiving area in a range defined by a first position and a second position, said metal wire being positioned above a portion of said receptacle when said support member is in said second position, wherein said metal wire is configured and dimensioned to define a substantially circular portion, said metal wire having a pair end portions being received within a pair of openings in said support member.

2. The deployable mechanism as in claim 1, further comprising a locking mechanism for securing said support member in either said first or said second position.

3. The deployable mechanism as in claim 1, further comprising a plurality of stabilizing tabs, each stabilizing tab including a finger portion extended outwardly from a tubular portion wherein said tubular portion is disposed around said metal wire.

4. The deployable mechanism as in claim 3, wherein said plurality of stabilizing tabs are constructed out of a polymer material.

5. The deployable mechanism as in claim 1, further comprising a plurality of rubber fingers molded onto said metal wire.

6. A deployable mechanism for retaining a beverage container, in a vehicle, comprising:
   a) a retaining member being configured and dimensioned to define an expandable receiving area;
   b) a support member being configured to receive and support said retaining member; and
   c) a receptacle, said receptacle having a receiving area configured and dimensioned to slidably receive said support member, a portion of said support member traveling into and out of said receiving area in a range defined by a first position and a second position, said retaining member being positioned above a portion of said receptacle when said support member is in said second position, wherein said support member has an upper surface, a lower surface, and a plurality of side walls, said lower surface includes a groove for receiving and engaging a portion of an elastic cord having a first end and a second end, said first end being secured to said receptacle, said elastic cord being extended through and received within said groove and said second end is secured to said receptacle, said elastic cord being configured and dimensioned to provide an urging force in the direction of said second position when said support member is in said first position, said first position corresponding to a stowed position of said deployable mechanism.

7. The deployable mechanism as in claim 6, wherein said elastic cord is a spring.

8. The deployable mechanism as in claim 6, wherein said upper surface further comprises a plurality of ribs providing an engaging surface.

9. The deployable mechanism of claim 8 wherein said expandable receiving area expands when a beverage container having a dimension larger than the unexpanded expandable receiving area of said retaining member is inserted therein.

10. A deployable mechanism for retaining a beverage container in a vehicle, comprising:
   a metal wire having resilient characteristics and being configured and dimensioned to define an expandable receiving area;
   a support member being configured to receive and support said metal wire;
   a receptacle, said receptacle having a receiving area configured and dimensioned to slidably receive said support member, a portion of said support member traveling into and out of said receiving area in a range defined by a first position and a second position, said metal wire being positioned above a portion of said receptacle when said support member is in said second position, wherein said metal wire is configured and dimensioned to define a substantially circular portion, said metal wire having a pair end portions being received within a pair of openings in said support member; and
   a locking mechanism for securing said support member in either said first or second position, wherein said locking mechanism comprises: a first notch disposed on a front wall of said support member proximate to an upper surface of said support member, said first notch is configured to engage a tab depending outwardly from an interior wall of the receiving area of said receptacle.

11. The deployable mechanism as in claim 10, wherein said locking mechanism further comprises: a second notch disposed on said front wall of said support member, said second notch being configured and positioned to engage said tab, said second notch engaging said tab when said support member is in said first position.

12. A deployable mechanism for retaining a beverage container in a vehicle, comprising:
   a metal wire having resilient characteristics and being configured and dimensioned to define an expandable receiving area;
   a support member being configured to receive and support said metal wire;
   a receptacle, said receptacle having a receiving area configured and dimensioned to slidably receive said support member, a portion of said support member traveling into and out of said receiving area in a range defined by a first position and a second position, said metal wire being positioned above a portion of said interior of said receptacle when said support member is in said second position, wherein said metal wire is configured and dimensioned to define a substantially circular portion, said metal wire having a pair end portions being received within a pair of openings in said support member; and
   a recessed area being located underneath said metal wire when said support member is in either said first or said second portion.

13. The deployable mechanism as in claim 12, wherein said deployable mechanism further comprises: a rubber mat being configured and dimensioned to be removably disposed within said recessed area.

14. The deployable mechanism as in claim 13, wherein said rubber mat further comprises a plurality of dimples disposed on a inner periphery said rubber mat providing a secured grip for said beverage container.

15. A deployable retaining member for receiving a vessel capable of containing a liquid, the deployable retaining member being configured for use in a vehicle, the deployable retaining member comprising:
   a receiving member being configured and dimensioned to define an expandable area;
   a support member being configured to support said receiving member;
   a receptacle having a receiving area configured and dimensioned to slidably receive said support member, a portion of said support member traveling into and out of said receiving area in a range defined by a first position and a second position, either said first position or said second position defining a stowed position of said receiving member and said support member, wherein during use said receiving member is disposed above said receptacle;

a locking mechanism for securing said support member in either said first or said second position, wherein said receiving member further comprises a pair of elongated portions being configured and dimensioned to be received within a pair of openings in said support member, said pair of elongated portions providing for securement of said receiving member to said support member; and a recessed area being disposed underneath said receiving member and being configured and dimensioned to receive said receiving member therein when said support member is in a stowed position.

16. The deployable retaining member as in claim 15, further comprising an urging member providing an urging force in the direction of said second position when said support member is in said first position.

17. The deployable retaining member as in claim 15, wherein said locking mechanism further comprises:

a) a first notch corresponding to said first position, said first notch being disposed on a surface of said support member; and b) a second notch corresponding to said second position, said second notch being disposed on said surface of said support member, said first notch and said second notch being configured to engage a tab extending from an interior wall of said receiving area.

18. The cup holder mechanism as in claim 15, further comprising a spring operably attached to said support member at one end and secured inside said receptacle at other end, said spring providing an urging force deploying said mechanism from said first position to said second position.

19. The deployable retaining member as in claim 15, further comprising a plurality of rubber fingers molded onto said receiving member.

* * * * *